United States Patent
Mueller (10) Patent No.: US 7,555,584 B2
(45) Date of Patent: *Jun. 30, 2009

(54) PROVIDING ADDITIONAL CHANNELS FOR AN MSL ARCHITECTURE

(75) Inventor: Peter D. Mueller, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 10/955,978

(22) Filed: Sep. 29, 2004

(65) Prior Publication Data

US 2006/0072536 A1    Apr. 6, 2006

(51) Int. Cl.
G06F 13/42 (2006.01)
H04L 9/00 (2006.01)
H04L 12/28 (2006.01)
H04B 7/212 (2006.01)

(52) U.S. Cl. .................. 710/106; 370/322; 370/390; 713/163

(58) Field of Classification Search .............. None
See application file for complete search history.

(56) References Cited

U.S. PATENT DOCUMENTS

| | | | | |
|---|---|---|---|---|
| 4,734,907 A * | 3/1988 | Turner | | 370/390 |
| 4,825,438 A * | 4/1989 | Bennett et al. | | 714/56 |
| 5,388,231 A | 2/1995 | Starr | | |
| 5,862,190 A * | 1/1999 | Schaffner | | 375/341 |
| 6,128,295 A * | 10/2000 | Larsson et al. | | 370/389 |
| 6,647,447 B1 * | 11/2003 | Kou | | 710/100 |
| 6,700,875 B1 * | 3/2004 | Schroeder et al. | | 370/252 |
| 6,725,311 B1 | 4/2004 | Joy et al. | | |
| 6,738,816 B1 * | 5/2004 | Momona | | 709/226 |
| 6,795,877 B2 | 9/2004 | Glenn | | |
| 6,831,918 B1 * | 12/2004 | Kavak | | 370/395.52 |
| 6,839,336 B2 | 1/2005 | Tiedemann, Jr. et al. | | |
| 6,842,133 B2 | 1/2005 | Woodward et al. | | |
| 6,965,580 B1 * | 11/2005 | Takagi et al. | | 370/312 |
| 7,023,813 B2 * | 4/2006 | Newberg et al. | | 370/312 |
| 7,072,313 B2 * | 7/2006 | Kronz | | 370/322 |

(Continued)

FOREIGN PATENT DOCUMENTS

EP    872970    10/1998

(Continued)

OTHER PUBLICATIONS

Mobile Scalable Link: A High Speed Serial Link Supporting Intel XScale Technology—Dated Jun. 2003—7 pages.*

(Continued)

Primary Examiner—Mark Rinehart
Assistant Examiner—Brian T Misiura
(74) Attorney, Agent, or Firm—Blakely, Sokoloff, Taylor & Zafman LLP (57) ABSTRACT

Method and apparatus relating to defining additional channels in an interprocessor communication system having broadcast and non-broadcast channels. A broadcast identifier may be sent on a channel defined to be non-broadcast, generating an additional broadcast channel outside the interprocessor communication protocol definition. Likewise a device-specific identifier may be sent on a channel defined to be a broadcast channel, generating an additional non-broadcast channel outside the interprocessor communication protocol definition.

21 Claims, 5 Drawing Sheets

U.S. PATENT DOCUMENTS

| | | | |
|---|---|---|---|
| 7,099,985 B2* | 8/2006 | Mueller | 710/307 |
| 7,184,789 B2* | 2/2007 | Leung et al. | 455/519 |
| 2003/0073453 A1* | 4/2003 | Basilier | 455/503 |
| 2003/0174662 A1 | 9/2003 | Malkamaki | |
| 2004/0266440 A1* | 12/2004 | Fuchs et al. | 455/445 |
| 2005/0013263 A1 | 1/2005 | Kim et al. | |
| 2005/0047359 A1* | 3/2005 | Sebire | 370/312 |
| 2005/0136992 A1* | 6/2005 | Mueller | 455/574 |
| 2005/0138301 A1* | 6/2005 | Mueller | 711/154 |
| 2005/0165949 A1 | 7/2005 | Teague | |
| 2005/0177712 A1* | 8/2005 | Kadi | 713/150 |
| 2005/0188173 A1* | 8/2005 | Hasbun et al. | 711/203 |
| 2005/0216596 A1* | 9/2005 | Mueller | 709/229 |
| 2006/0037037 A1* | 2/2006 | Miranz | 725/2 |
| 2006/0047883 A1 | 3/2006 | O'Connor et al. | |
| 2006/0072536 A1 | 4/2006 | Mueller | |
| 2006/0075145 A1* | 4/2006 | Mueller | 710/3 |

FOREIGN PATENT DOCUMENTS

| | | | |
|---|---|---|---|
| EP | 0872970 A2 | 10/1998 | |

OTHER PUBLICATIONS

"Mobility Maximized: Intel Redefines What a Wireless Handheld Can Do"—Kyle Fox—May 2004—pp. 1-8.*

"Intel PXA27x Processor Family"—Product Brief—pp. 1-4, obtained from website: http://www.intel.com/design/pca/prodbref/253820.htm.*

"Intel Launches Bulverde, Marathon"—by Tony Smith—pp. 1-3—Published Apr. 12, 2004—obtained via website: http://theregister.co.uk/2004/04/12/intel_ships_bulverde/.*

Jay Gilbert, Mobile Scalable Link: A High Speed Serial Link Supporting Intel Xscale Technology, *Technology@Intel Magazine*, Jun. 2003, p. 1-7.

PCT International Search Report and Written Opinion, PCT Application No. PCT/US2005/031312, filed Sep. 1, 2005, 12 pg.

Jay Gilbert, Vivek G. Gutpa, Mobile Scalable Link: A High Speed Serial Link Supporting Intel XScale Technology, Technology@Intel Magazine, Jun. 2003, 7.

Vivek G. Gupta et al., "Introduction to Mobile Scaleable Linke (MSL) Technology", *Intel Optimizing Center*, Jan. 28, 2004, 6 pages, Intel Software and Solutions Newsletter.

"NALL Mailed Dec. 12, 2006 for U.S. Appl. No. 10/955,984", Whole Document.

"OA Mailed Jun. 20, 2006 for U.S. Appl. No. 10/955,984", Whole Document.

"OA Mailed Sep. 11, 2008 for KR Patent Application 2007-7007086", Whole Document.

"ISR and WO Mailed Jun. 3, 2006 for PCT Application PCT/US2005/031434", Whole Document.

First Office Action for Chinese Application No. 200580032462.0 dated Apr. 4, 2008.

* cited by examiner

FIG. 1

| CHAN | DEVICE-SPECIFIC ADDRESS | BROADCAST ADDRESS |
|---|---|---|
| 0 | EOM (END OF MESSAGE) | RFU (RESERVED FOR FUTURE USE) |
| 1 | DATA CHANNEL 1 | RFU |
| 2 | DATA CHANNEL 2 | RFU |
| 3 | DATA CHANNEL 3 | RFU |
| 4 | DATA CHANNEL 4 | RFU |
| 5 | DATA CHANNEL 5 | RFU |
| 6 | DATA CHANNEL 6 | RFU |
| 7 | DATA CHANNEL 7 | RFU |
| 8 | RFU | ENABLE REQ |
| 9 | RFU | DISABLE REQ |
| 10 | SNOOP | RFU |
| 11 | IDLE | RFU |
| 12 | WAKE-UP | RFU |
| 13 | VIRTUAL GPIO CHANNEL | RFU |
| 14 | BOA (BEGINNING OF ARBITRATION) | RFU |
| 15 | RFU | EOA (END OF ARBITRATION) |

PROVIDING ADDITIONAL CHANNELS FOR AN MSL ARCHITECTURE

RELATED APPLICATIONS

This Application is related to U.S. patent application Ser. No. 10/955,984, entitled "Transfer Acknowledgement Mechanism for an MSL Architecture," having common Inventorship, and filed concurrently herewith.

FIELD

Embodiments of the invention relate to interprocessor communication, and specifically to a channel definition mechanism in a Mobile Scalable Link (MSL) architecture.

BACKGROUND

Traditional interprocessor communication following the Mobile Scalable Link (MSL) protocol is limited to the channel definitions of the MSL specification. Specifically, four bits are available under the MSL architecture to specify a channel, and all 16 potential channels are defined in MSL2. Additionally, traditional MSL data transfer is unidirectional, providing only for a transmitting device to send data, and not providing a mechanism for the receiving device to acknowledge that the data was properly received.

BRIEF DESCRIPTION OF THE DRAWINGS

The description of embodiments of the invention includes various illustrations by way of example, and not by way of limitation in the figures and accompanying drawings.

DETAILED DESCRIPTION

Various references herein to an "embodiment" are to be understood as describing a particular feature, structure, or characteristic included in at least one embodiment of the invention. Thus, the appearance of phrases such as "in one embodiment," or "in alternate an embodiment" may describe various embodiments of the invention, and may not necessarily all refer to the same embodiment.

Figure 1:
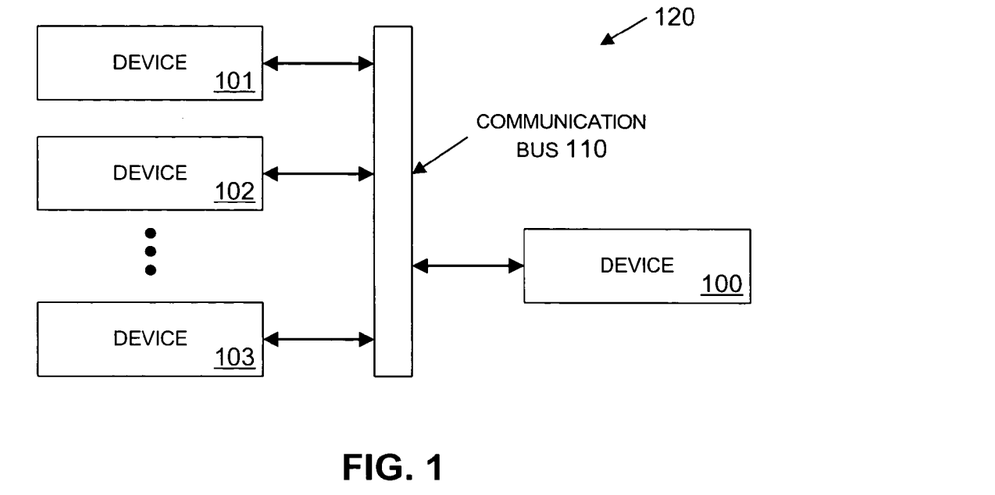
FIG. 1 is a block diagram of a system employing an interprocessor communication architecture in accordance with an embodiment of the invention.

FIG. 1 is a block diagram of one embodiment of a system employing an interprocessor communication architecture. System 120 may include multiple devices, apparatuses, machines, etc., in communication over communication bus 110. System 120 represents various types of devices that may have multiple devices on an interconnect, including cellular telephones, personal digital assistants (PDAs), wireless communication devices, portable computing devices, etc. System 120 may also represent other devices, for example, digital watches, stereo systems, cameras, etc.

Communication bus 110 represents one or more signal lines between the various devices of system 120. In one embodiment communication bus 110 may represent the physical interconnect among the various devices. In one embodiment communication bus 110 may include data lines and sideband signal lines. For example, communication bus 110 may be a Mobile Scalable Link (MSL) or MSL2 multi-drop bus.

Data lines that may be present on communication bus 110 provide a communication interface over which several logical channels may exist. In one embodiment the channels may be multiplexed over the physical lines. Communication may be specified to operate over channels that are broadcast channels and others that are non-broadcast, or device-specific. For example, a protocol may specify two or more header fields, one of which is an address or other identifier (generically, an ID, or a device specific ID), and a channel number. When these fields are placed on the data lines, the channel corresponding to the number is activated, and the identified device(s) are indicated to receive the data payload.

One or more channel numbers may be defined to be broadcast channels, and one or more channel numbers may be defined to be non-broadcast, or device-specific channels. Besides having a particular channel number definition, in one embodiment a difference between a broadcast channel and a non-broadcast channel is the manner in which the channel is invoked. For example, a broadcast channel may be specified by a broadcast channel number and a broadcast ID, or some identifier defined to indicate that all devices on communication bus 110 should listen. A non-broadcast channel may be a channel for which a channel number is defined as a device-specific channel, and a device-specific ID is placed on the data lines. Thus, a broadcast channel may provide communication from one device to multiple, or all other devices on communication bus 110, and a non-broadcast channel may provide communication from a transmitting device to a specific device matching the ID number.

Sideband lines are to be understood as one or more signal lines that may be present between two or more devices, and which may be asserted (set high (logic one) for active-high lines, and set low (logic zero) for active-low lines) to provide information between two or more communicating devices independent of, in conjunction with, in parallel with, the data lines. Sideband lines may be lines to indicate, for example, a ready to send signal, a wait signal, a system clock line, etc.

In one embodiment communication bus 110 may be controlled through arbitration. In an arbitration scheme, a single device at a time may have control of the bus. Specifying that a device has "control" of the bus may refer to the data lines and the side band lines. Alternatively, specifying that a device controls the bus may refer simply to the device having the right to communicate on one or more of the physical lines of communication bus 110. In one embodiment arbitration may be used to designate a master and a slave device on the bus. The master may have the right to place a message (e.g., an ID, a channel number, a data byte, etc.) on the data lines. The master device is thus the device designated with an opportunity to transmit. A slave does not have a right to place a message on the data lines while a master controls the bus. A slave may thus be a device designated to receive, or a device that is not receiving communication, but should wait until a communication is sent to the device, or the device has an opportunity to transmit. However, in one embodiment one or more sideband signals may be asserted by a receiving device or a slave device even when the bus is controlled by a master. The devices may alternate control of the bus, or the data lines, for each to have an opportunity to transmit.

Thus, device 100 may control the bus, and may be considered the master. In one embodiment device 100 represents a subsystem, a circuit, a processor, etc. As a processor, device 100 may represent a general-purpose processor in system 120, an applications processor (e.g., a device that has access and/or control of one or more application level programs/code executions on system 120), etc. In one embodiment a high-level processor in system 120 may begin as the bus master, and may generate the clock signal for communication bus 110. The high-level processor may alternate as a slave on communication bus 110 during operation of system 120. More or fewer devices may be present in system 120 than those shown.

Devices 101-103 represent other circuits, subsystems, processors, logic arrays, peripherals, external servers, etc. Each device 101-103 may represent the master device at some point of operation/execution of system 120. At other times, these devices represent slave devices attached to communication bus 110. If FIG. 1 were to be considered a snapshot in execution of system 120, these devices may currently be considered to be the slave devices, and would receive a message and/or remain idle until such time as they receive a message and/or transmit.

In one embodiment communication bus 110 may support a broadcast channel and a non-broadcast channel, with the broadcast channel being specified by a particular channel number and a broadcast ID, and the non-broadcast channel being specified by another, different particular channel number and a device-specific ID. In one embodiment the broadcast ID is hexadecimal "F". In one embodiment the device-specific ID is a number of the range 0-7. In one embodiment the number of channels may be, for example, 8, 16, 128, etc. The number of channels may depend on the number of bits used to specify the channel number. For example, a channel number identifier of one nibble (four bits) has the potential to identify 16 different channels. Suppose that all potentially available channels are defined as either broadcast or non-broadcast channels. If all channels are defined, there would traditionally be no channels reserved for future use.

In one embodiment, a system with all potential channels defined as either broadcast or non-broadcast channels may employ a mechanism to define more channels within the same address space. For example, if a broadcast channel is defined, a device-specific ID may be used in conjunction with the broadcast channel. Similarly, a broadcast ID may be used with a non-broadcast channel. Thus, whether a channel is a broadcast channel or a non-broadcast channel could in one embodiment be changed from being a function of the specified channel number to a function of the ID number placed on the data channels. A number of extra broadcast channels up to the number of protocol-specified non-broadcast channels may be created and employed for uses other than what may be defined in the specification/protocol definition. Similarly, a number of extra non-broadcast channels up to the number of broadcast channels may be created and employed for uses other than what may be defined in the specification/protocol definition.

Figure 2:
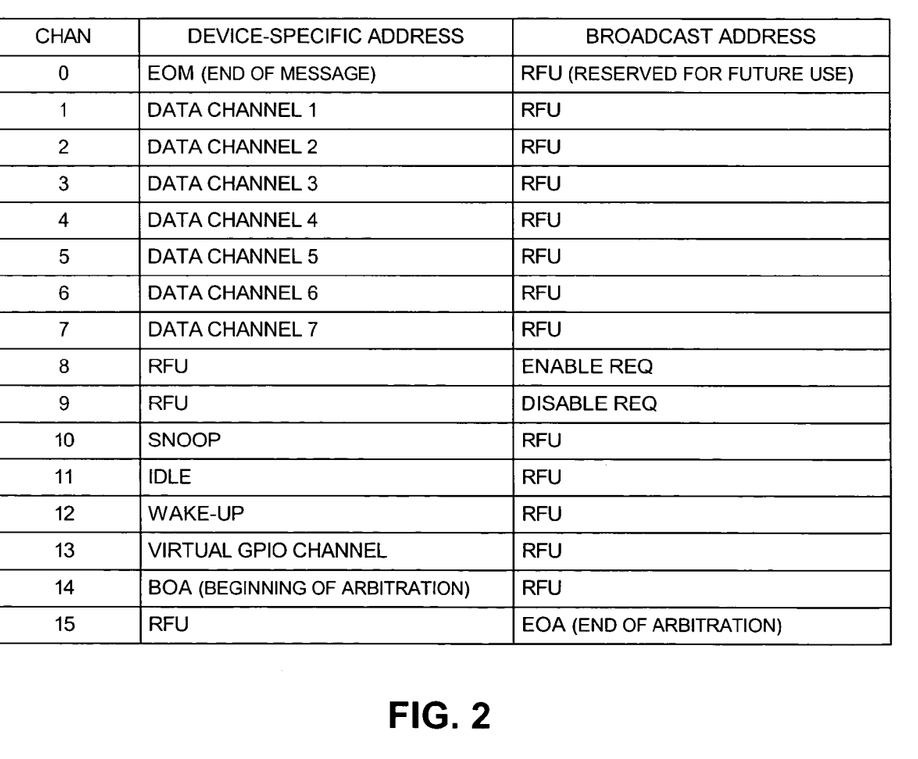
FIG. 2 is a block diagram of a channel definition of an interprocessor communication specification in accordance with an embodiment of the invention.

FIG. 2 is a block diagram of one embodiment of a channel definition of an interprocessor communication specification. In one embodiment an interprocessor communication definition, may define channels that employ a device-specific address and channels that employ a broadcast address. In one example, MSL defines 16 channels, with channels 8, 9, and 15 dedicated to broadcast use, and the remaining channels for device-specific message transfer. Traditional MSL does not allow for channels beyond the 16 defined channels.

In one embodiment a device-specific address is employed with one of channels 8, 9, and/or 15 to provide an additional device-specific message transfer mechanism. In FIG. 2 these are specified as reserved for future use (RFU) channels. These channels are reserved because the MSL specification does not define them. Because they are not defined, a system designer may define these channels for a custom, specific application or use.

In one embodiment a broadcast address is employed with one of channels 0-7 and/or 10-14 to provide an additional broadcast message transfer mechanism. Again, these channels may be custom defined for system broadcast information. For example, custom system status, messages, etc., may be useful for certain devices in a system.

Because these channels are not defined in traditional MSL, a system using one or more RFU channels may still be backwards compatible with a traditional system. For example, because a broadcast address is defined as being used with broadcast channel 8, if an address other than a broadcast address is specified for the broadcast channel, the devices in the system may ignore the message. The device-specific address used may be for a device that will listen on the broadcast channel and decode the message when its own device ID is the address specified on the broadcast channel.

Figure 3:
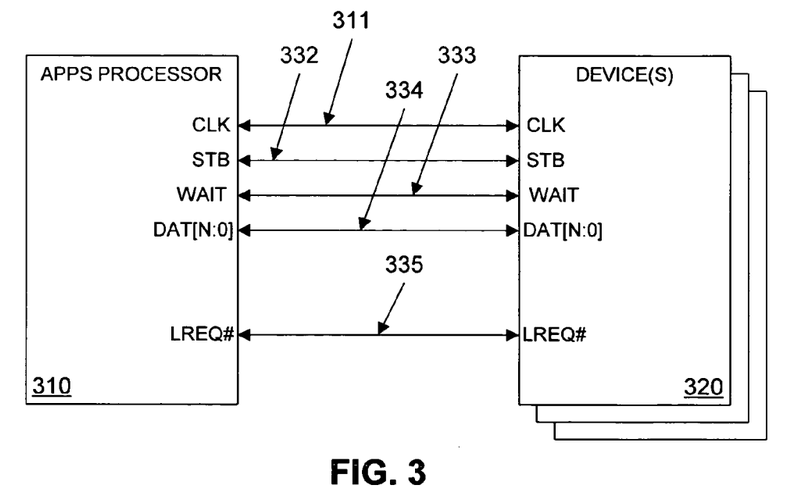
FIG. 3 is a block diagram of a communication bus of a system employing an interprocessor communication specification in accordance with an embodiment of the invention.

FIG. 3 is a block diagram of one embodiment of a communication bus of a system employing an interprocessor communication specification. Applications processor 310 may be a processor, subsystem, gate array, etc., that may perform application level functions in a system. Applications processor 310 may include an interface to facilitate interprocessor communication between applications processor 310 and one or more other processors, devices, subsystems, etc., for example, devices 320. Devices 320 may represent subsystems and/or drivers that control peripherals, circuits, hardware, etc.

In one embodiment applications processor 310 is a bus master, meaning applications processor 310 controls one or more portions of the physical interconnection lines between itself and devices 320. Applications processor 310 may include an interface to the physical interconnection with the devices 320. Similarly, devices 320 may include interfaces to the physical interconnection. The interfaces may include one or more of a pin, a receive circuit, a drive circuit, a pull-up/pull-down circuit, a buffer, etc., to couple the devices/processor to the physical interconnect. The physical interconnection may include multiple signal lines, and may include a clock signal CLK 311, a strobe signal STB 332, a wait signal WAIT 333, data lines DAT[N:0] 334, and an arbitration signal LREQ# 335. While these signals are shown, more or fewer signal lines may be present in a system.

In one embodiment DAT[N:0] 334 represents multiple signal lines (e.g., 4, 8) over which interprocessor communication may be transmitted. The other signal lines may be referred to as sideband signal lines. In one embodiment a master device controls DAT[N:0] 334. The master device may also control one or more sideband lines. As represented by LREQ# 335, control of the bus may be arbitrated, meaning control will change, and a device that is at one point the master may be a slave on the bus at another point in time. In one embodiment sideband signals, e.g., WAIT 333 may be asserted by a slave device on the bus.

In one embodiment a channel may be specified by placing one bit of a nibble on each of four data lines 334 of DAT[3:0]. In another embodiment data lines 334 may include eight data lines DAT[7:0], and a full byte may be placed on the lines. Alternatively, a system could be designed to have each line divided into timeslots, and each of data lines DAT[N:0] 334 may represent use different data channels separately. The system may operate to have a channel number, device ID, and data payload placed on DAT[N:0] 334. In one embodiment a channel may be activated when a channel number and an identifier is placed on DAT[N:0]. The identifier may be decoded at the receiving device(s) to determine whether the receiving device is an intended receiver.

In a system where $2^N$ channels are defined, with some broadcast channels and some non-broadcast channels, a device-specific ID may be specified on a broadcast channel to provide an additional device-specific message transfer mechanism. Similarly, a broadcast ID may be specified on a device-specific channel to provide an additional broadcast message transfer mechanism. Thus, a standard channel definition may be enhanced to create a modified channel definition to include message transfer with an identifier other than one defined in the standard. Thus, a decoder may receive as valid a message that has an identifier other than one expected on the channel according to the specification.

Figure 4:
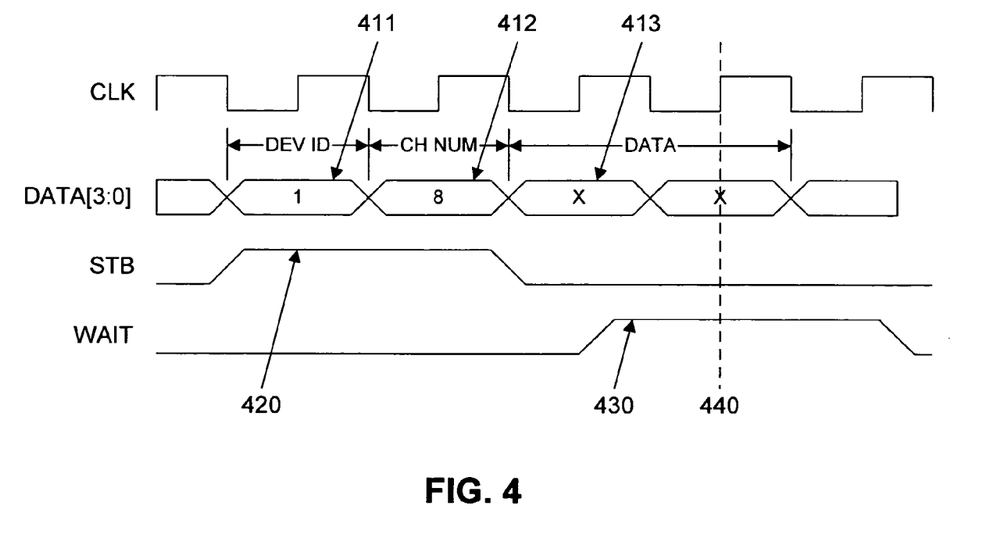
FIG. 4 is a block diagram of a timing diagram for communication in accordance with an embodiment of the invention.

FIG. 4 is a timing diagram for one embodiment of interprocessor communication as described above. CLK represents the clock pulses in the timing diagram. The shared interprocessor communication bus may include a clock signal to synchronize devices on the bus at least as far as communication on the bus is concerned. In one embodiment DATA[3:0] may include a device ID field 411, channel number field 412, and data field 413. Additional fields and/or different field sizes may also be supported.

A broadcast ID or a device-specific address/ID may be placed in device ID field 411 to indicate the intended message audience. A broadcast ID may indicate the message should be decoded by more than a single slave device. A device-specific ID may indicate the message should be decoded only by the specified intended recipient. For example, in FIG. 4, a device-specific ID of "1" indicates the device with address/identifier "1" is the intended recipient of the message to be transmitted on DATA[3:0]. In one embodiment a device ID of "F" may indicate a broadcast message, which assumes that fewer than $2^N$, or 16 in this example, devices may be supported in the system.

Channel number 412 may be specified to be any of the channels defined for the system. In one embodiment assume that all $2^N$ potential channels are defined in the interprocessor communication definition, where N represents the number of bits/lines used to represent the channel number. Further suppose that at least one channel is defined as a broadcast channel, which is defined to have a corresponding broadcast ID placed in device ID field 411. In one embodiment channel 8 shown in channel number 412 represents a defined broadcast channel. Thus, a broadcast channel is specified with a device-specific ID of 1. Because the channel and device ID are mismatched according to the protocol, devices on the bus may ignore the message. Because the message is addressed to device 1, device 1 may be operable to decode the message, even though the message may be technically improper according to the standard protocol definition. In this way an additional channel may be supported.

In one embodiment the protocol associated with the system and timing diagram of FIG. 4 may be unidirectional, or transmit only, meaning the receiving device has no way in the standard protocol definition to acknowledge transfer. The standard acknowledgement mechanism may be defined by the protocol as the receiving device arbitrating for control of the bus, establish ownership of the bus, and then transmit an acknowledge cycle to the original sending device. If there are multiple devices in the platform/system also requesting the bus, this process could produce a substantial delay in acknowledging the transfer. In the case of needing to retransmit the message for failed reception, the process may extend even further. Thus, standard acknowledgement may be inefficient in terms of performance, power, and timing.

In one embodiment a transmitting device, or master (the device with established ownership) may follow transfer of a data message with transfer of an acknowledge message. The data message may follow standard communication protocol specifications using a data channel to a particular device. The acknowledge message may be transmitted by placing a device-specific ID in device ID field 411, and a broadcast channel in channel number field 412. One or more nibbles of data may be placed in data field 413. In one embodiment the value of the data placed in data field 413 during an acknowledge is a "Don't Care". In one embodiment a specific acknowledge value may be employed. During the acknowledge message, the receiving device may assert or de-assert one of the sideband signals to indicate whether the message was received.

For example, in the example of FIG. 4, the channel/control strobe 420 may be asserted while the transmitting device specifies a device ID of "1" and a broadcast channel "8." Data 413 is a Don't Care, and the receiving device asserts the WAIT signal 430 during the data payload of the transmitting device's message. Depending on system implementation, asserting WAIT 430 during the message may indicate the message should be resent. Alternatively, asserting WAIT 430 during the message may indicate the message was properly received. The original transmitting device may sample WAIT signal 430 at time 440 to "read" or "receive" the acknowledge message of the original receiving device.

Sampling time may depend on system implementation. There may be one or more nibbles of data payload during which time the original receiving device has to acknowledge a message transfer from the original transmitting device. Two nibbles of data are shown merely for purposes of illustration, and is not to be interpreted as being required or limiting.

Figure 5:
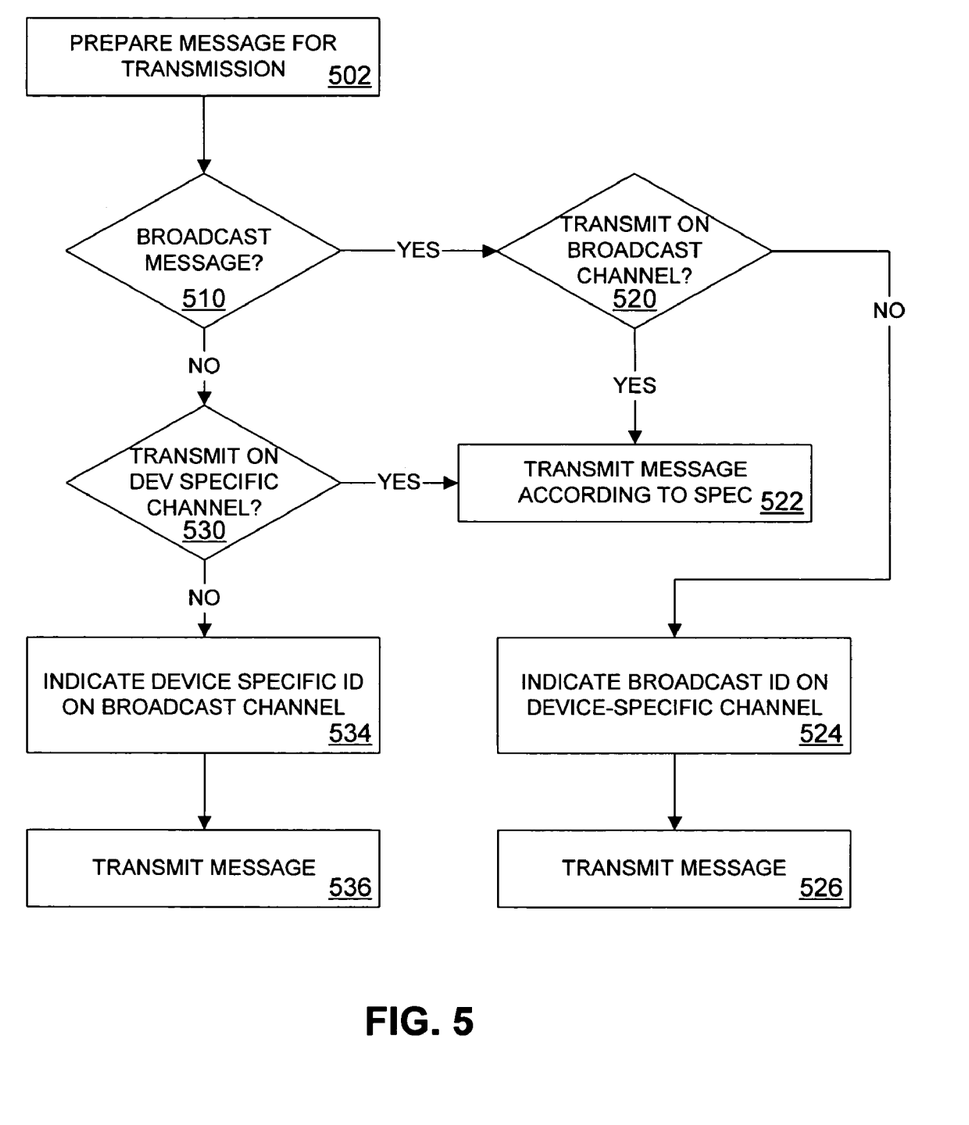
FIG. 5 is a flow diagram of transmission of an interprocessor message in accordance with an embodiment of the invention.

FIG. 5 is a flow diagram of one embodiment of transmission of an interprocessor message. In one embodiment multiple processors, subsystems, peripherals, etc. are interconnected on a bus. Interprocessor communication may be facilitated through the use of messages across the bus. A message may be prepared for transmission, 502. A device with ownership/control of the bus and/or the data lines may be permitted to transmit a message. The intended receiver or receivers may act as slaves on the bus while the transmitting device is the master.

It is determined whether the message is broadcast or non-broadcast, 510. For example, a transmitting module on a transmitting device may determine that a broadcast message is being sent. In another example, a processor that generates the message for transmission indicates to a transmitter that the message is either broadcast or non-broadcast. A broadcast message is intended for multiple receivers, and may not indicate a specific receiving device. A non-broadcast message is intended for one or more specified receivers, which may be identified by a device ID. If the message is a broadcast message, it is determined whether the message will be transmitted on a broadcast channel, 520. For example, the communication protocol employed by the transmitting device to engage in interprocessor communication may specify certain message types to be transmitted on certain defined channels, according to a standard protocol specification/definition. If the broadcast message is a broadcast message that matches with a definition of a broadcast channel, the message may be transmitted according to the standard specification, 522.

If the message is a broadcast message that does not match a standard specification definition, a broadcast ID and a non-broadcast channel may be specified, 524. The message may then be transmitted, 526.

If the message is not a broadcast message, it is a non-broadcast message, and it is determined whether the message will be transmitted on a standard device-specific channel, 530. For example, a transmitter may access a look-up table, a storage location, etc., that indicates a channel to use for a particular message. A device-specific channel may be one that is defined in the specification for transfer of a particular message type to a device specified by a device ID. If the non-broadcast message is a message that matches with a definition of a device-specific channel of the specification, the message may be transmitted according to the standard specification, 522.

If the message is a device-specific message that does not match a standard specification definition, a device-specific ID and a broadcast channel may be specified, 534. The message may then transmitted, 536.

Figure 6:
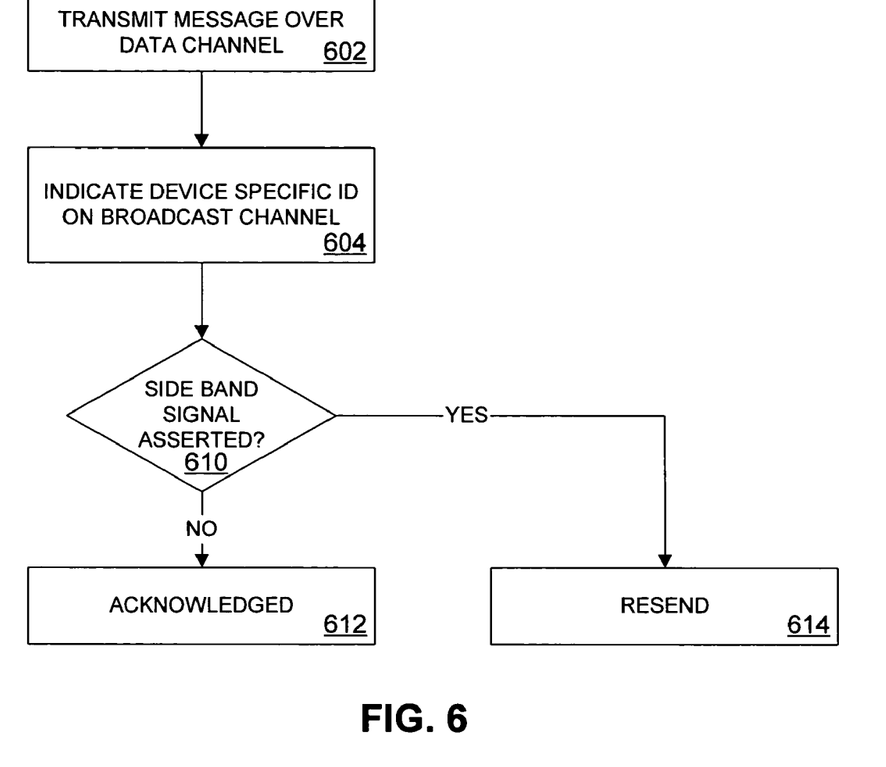
FIG. 6 is a flow diagram of an acknowledgement of an interprocessor message transfer in accordance with an embodiment of the invention.

FIG. 6 is a flow diagram of one embodiment of an acknowledgement of an interprocessor message transfer. A message may be transferred from a transmitting device to a receiving device over a data channel, 602. This may be a message that complies with the channel and transfer definitions of an interprocessor communication specification. A data transfer on a data channel may involve specifying the data channel and a device-specific ID.

In one embodiment transmission may be unidirectional, and a mechanism for acknowledging the transfer is not provided in the specification. A device-specific ID may be specified on a channel that is traditionally a broadcast channel, 604, as described above. The device-specific ID may cause the message to be received and decoded only by the intended receiver, even though messages transferred on the specified broadcast channel would normally be listened to and decoded by all devices on the interconnection.

A first transmission may be according to the protocol specification, and a second transmission may be a device-specific communication on a channel not defined for device-specific transfer. In one embodiment the receiver may assert a sideband signal, e.g., a flow control signal line, to indicate an acknowledgement to the transmitting device. It is determined whether a sideband signal is asserted, 610. For example, the master may test/determine for the condition/state of the sideband line (e.g., asserted or not asserted) to receive an indication from the original receiving device whether the message was received. Asserted means that a signal line is driven high for an active-high signal line, and driven low for an active-low signal line.

If the sideband signal is asserted, the original receiving device may be indicating to the original transmitting device that the message was not properly received, and the message should be resent, 614. If the sideband signal is de-asserted, the original receiving device may be indicating to the original transmitting device that the message was properly received, and the message may be thus acknowledged, 612. These indications could be switched, in that an asserted signal may indicate a properly received signal, and a de-asserted signal may indicate the message should be resent.

The various operations of FIGS. 5 and 6 in the various embodiments may be performed utilizing the structures described herein. Additionally, machine-accessible and/or executable sequences of instructions/code may be used to perform operations described in FIGS. 5 and 6. Thus, the operations described may be implemented with firmware, software, or a combination of firmware and software. The software and/or firmware content may provide instructions to result in hardware, a machine, an electronic device, etc., executing/performing various operations, including some or all of the functions/features described above.

Instructions to cause or result in a machine/electronic device/hardware to perform the operations may be received via an article of manufacture. An article of manufacture may include a machine accessible medium having content to provide the instructions. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc.

Figure 7:
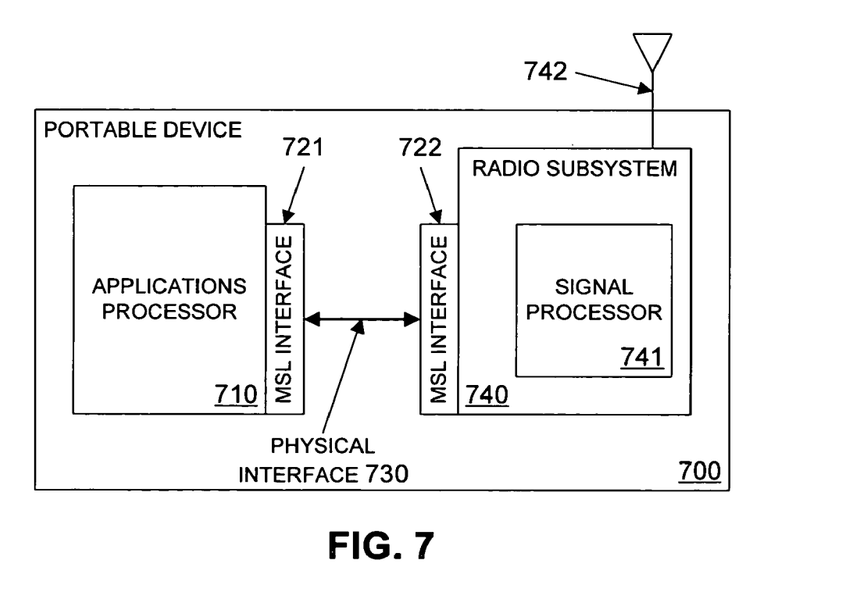
FIG. 7 is a block diagram of a portable device having processors with a physical interconnect in accordance with an embodiment of the invention.

FIG. 7 is a block diagram of one embodiment of a portable device having processors with a physical interconnect. Portable device 700 may represent various devices, hardware units, electronic structures, etc. For example, portable device 700 may be a cell phone, a smartphone, a personal digital assistant (PDA), a personal computing device, etc. Portable device 700 may include a computing platform on which computing hardware operates. The computing platform may include the computing hardware and/or operating systems, hardware drivers, and/or applications to provide the functionality of portable device 700. In one embodiment applications processor 710 may be a circuit, processor, subsystem, etc., on the host platform. In one embodiment applications processor 710 may be the computing platform of portable device 700. Applications processor 710 may be one or more hardware components, and/or including a general purpose processor.

Applications processor 710 may include MSL interface 721 that provides an interface to physical interface 730 to radio subsystem 740. Radio subsystem 740 likewise may include MSL interface 722 to interface to physical interface 730. For example, MSL interfaces 721-722 may include pins, circuits, buffers, line drivers, or other hardware/packaging to provide access from applications processor 710 and radio subsystem 740 to physical interface 730 between the devices. Physical interface may represent a high throughput communication bus/interface for data transfer between applications processor 710 and radio subsystem 740.

In one embodiment radio subsystem 740 represents a peripheral device on portable device 700. Radio subsystem 740 may include signal processor 741 to provide radio communication processing functionality to radio subsystem 740. In one embodiment signal processor 741 may be an embedded processor on portable device 700.

Physical interface 730 in one embodiment may be a communication bus based on or derived from the Mobile Scalable Link (MSL) or MSL2 standard specification/definition/protocol. Channels may be defined, or assigned particular functions/uses in the standard. For example, in one embodiment physical interface 730 may include multicast or broadcast channel(s) and device-specific channel(s), as defined/assigned by the standard. Multicast data may be understood as corresponding to a message/a transfer occurring on a multicast channel. Likewise, broadcast data or a broadcast transfer may be understood as corresponding to a message/transfer on a broadcast channel, and device-specific data/transfer may refer to a message transfer on a device-specific (or non-broadcast, non-multicast) channel.

A broadcast channel may be understood to be a subset of types of multicast channel in that a multicast channel may be defined to transfer a message to multiple recipients simultaneously. A broadcast channel may be defined to transfer the message simultaneously to all potential recipients, or all devices on physical interface 730. A device-specific channel may be defined to transfer a message to a single, specified recipient. Of all devices on physical interface 730, it may be that the only device to which a device-specific message is transferred is the device corresponding to the device-specific identifier/address indicated in activating the device-specific channel.

In one embodiment a broadcast message may be made on a device-specific channel on physical interface 730 as discussed above. Namely, a broadcast ID may be used to invoke/activate the device-specific channel on physical interface 730 and the message transferred. Similarly, a device-specific message may be transferred on a broadcast channel on physical interface 730 by, for example, invoking/activating the broadcast channel with the device-specific ID and the message transferred.

In one embodiment physical interface 730 may include one or more control signals/lines. In one embodiment one or more control signals may be activated/controlled by a device that does not have ownership of the data bus on which the broadcast and device-specific channels are operated. A flow control signal line may be present, such as a wait or equivalent control signal to provide a mechanism for a receiving device to indicate to the transmitting device that it is presently unable to receive the transmitted message. For example, the signal may be asserted when a buffer overflow occurs. In one embodiment a control signal may be used to implement an acknowledge mechanism. For example, by using a device-specific address on a broadcast channel as described above, a transmitting device may provide a time period for the receiving device to indicate whether a message was received, or whether the message should be resent. If a transmitting device follows a normal (e.g., according to the standard protocol) data transfer with a modified transfer (e.g., mismatching the device ID with the channel type), this modified transfer may be decoded at the receiver indicated by the device ID that the receiver should activate the control signal to indicate an acknowledge. The specific acknowledge mechanism may be up to individual design, and one example may include asserting the control signal to indicate a negative acknowledgement, meaning the message should be resent.

Figure 8:
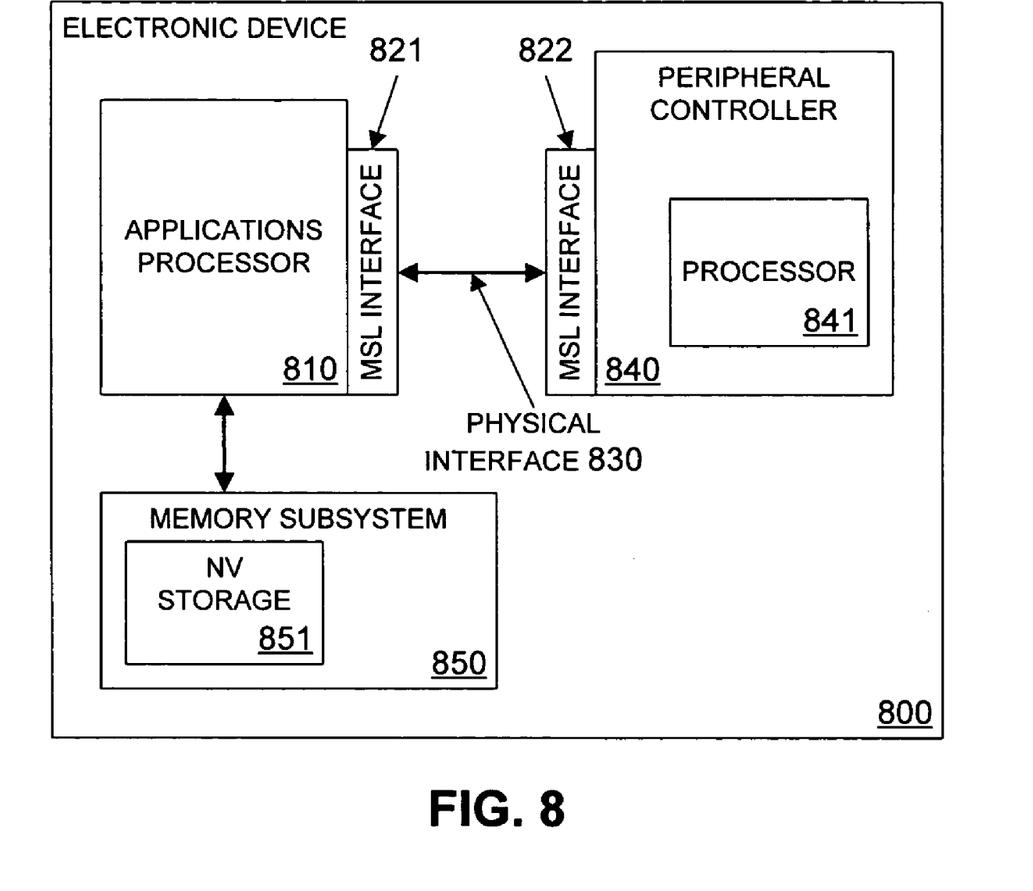
FIG. 8 is a block diagram of an electronic device having processors with a physical interconnect and a memory subsystem in accordance with an embodiment of the invention.

FIG. 8 is a block diagram of one embodiment of an electronic device having processors with a physical interconnect and a memory subsystem. Electronic device 800 represents various devices, machines, hardware units, electronic structures, etc. For example, electronic device 800 may be a cell phone, a smartphone, a personal digital assistant (PDA), a digital data organizer, a personal computing device, etc. Electronic device 800 may include a computing platform on which computing hardware operates. The computing platform may include the computing hardware and/or operating systems, hardware drivers, and/or applications to provide the functionality of electronic device 800. In one embodiment applications processor 810 represents a circuit, processor, subsystem, etc., on the host platform. In one embodiment applications processor 810 represents the computing platform of electronic device 800. Applications processor 810 may be one or more hardware components, and/or including a general purpose processor.

Applications processor 810 may include MSL interface 821 that provides an interface to physical interface 830 to peripheral controller 840. Peripheral controller 840 likewise may include MSL interface 822 to interface to physical interface 830. For example, MSL interfaces 821-822 may include pins, circuits, buffers, line drivers, or other hardware/packaging to provide access from applications processor 810 and peripheral controller 840 to physical interface 830 between the devices. Physical interface 830 may represent a high throughput communication bus/interface for data transfer between applications processor 810 and peripheral controller 840.

In one embodiment peripheral controller 840 represents a variety of peripheral devices/subsystems on electronic device 800. For example, peripheral controller 840 may represent components of a user interface (e.g., a liquid crystal display (LCD), a touchscreen, a keyboard or equivalent, etc.). Peripheral controller 840 may include processor 841 to provide processing functionality to peripheral controller 840. In one embodiment processor 841 may be an embedded processor on electronic device 800.

Physical interface 830 in one embodiment may be a communication bus based on or derived from the Mobile Scalable Link (MSL) or MSL2 standard specification/definition/protocol. Channels may be defined, or assigned particular functions/uses in the standard. For example, in one embodiment physical interface 830 may include multicast or broadcast channel(s) and device-specific channel(s), as defined/assigned by the standard. Multicast data may correspond to a message/a transfer occurring on a multicast channel. Likewise, broadcast data or a broadcast transfer may correspond to a message/transfer on a broadcast channel, and device-specific data/transfer may refer to a message transfer on a device-specific (or non-broadcast, non-multicast) channel.

A broadcast channel may be a subset of types of multicast channel in that a multicast channel may be defined to transfer a message to multiple recipients simultaneously. A broadcast channel may transfer the message simultaneously to all potential recipients, or all devices on physical interface 830. A device-specific channel may transfer a message to a single, specified recipient. Of all devices on physical interface 830, it may be that the only device to which a device-specific message is transferred is the device corresponding to the device-specific identifier/address indicated in activating the device-specific channel.

In one embodiment a broadcast message may be made on a device-specific channel on physical interface 830 in accordance with that discussed above. Namely, a broadcast ID may be used to invoke/activate the device-specific channel on physical interface 830 and the message transferred. Similarly, a device-specific message may be transferred on a broadcast channel on physical interface 830 by, for example, invoking/activating the broadcast channel with the device-specific ID and the message transferred.

In one embodiment physical interface 830 may include one or more control signals/lines. In one embodiment one or more control signals may be activated/controlled by a device that does not have ownership of the data bus on which the broadcast and device-specific channels are operated. A flow control signal line may be present, such as a wait or equivalent control signal to provide a mechanism for a receiving device to indicate to the transmitting device that it is presently unable to receive the transmitted message. For example, the signal may be asserted when a buffer overflow occurs.

In one embodiment a control signal may be used to implement an acknowledge mechanism. For example, by using a device-specific address on a broadcast channel as described above, a transmitting device may provide a time period for the receiving device to indicate whether a message was received, or whether the message should be resent. If a transmitting device follows a normal (e.g., according to the standard protocol) data transfer with a modified transfer (e.g., mismatching the device ID with the channel type), this modified transfer may be decoded at the receiver indicated by the device ID that it should activate the control signal to indicate an acknowledge. The specific acknowledge mechanism may be dependent upon individual design, and one example may include asserting the control signal to indicate a negative acknowledgement, meaning the message should be resent.

In one embodiment electronic device may include memory subsystem 850. Memory subsystem 850 may include a memory controller, logic, one or more memory devices, etc. In one embodiment memory subsystem 850 may include non-volatile storage 851, which represents memory that retains its information/values even when power is disabled to electronic device 800. For example, non-volatile storage 851 may include read only memory (ROM), Flash, programmable ROM (PROM), electronic PROM (EPROM), etc.

Besides what is described herein, various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A method for communication between two devices, comprising:
    providing multiple logical channels including a broadcast channel on a physical interconnect between the devices, the physical interconnect having a standard definition of the logical channels, wherein any broadcast on the broadcast channel is defined in the standard definition to be identified by transmitting a broadcast channel number and a broadcast message identifier on the physical interconnect to transmit to multiple devices on the physical interconnect;
    transmitting a data message on the broadcast channel with the broadcast channel number and a device-specific identifier to indicate a specific device;
    providing a non-broadcast channel on the physical interconnect between the devices, the non-broadcast channel defined in the standard definition to be identified by a channel number and a device-specific identifier to transmit to a specific device identified by the device-specific identifier; and
    transmitting a broadcast message on the non-broadcast channel with a broadcast identifier to indicate multiple devices.

2. A method according to claim 1, wherein the standard definition complies with a Mobile Scalable Link (MSL) interconnect specification.

3. A method according to claim 2, wherein the channel number comprises one of channels 8, 9, or 15.

4. A method according to claim 1, wherein the broadcast message identifier indicates a transmission to all devices on the physical interconnect.

5. A method according to claim 1, wherein the device-specific identifier indicates an address of the specific device on the physical interconnect.

6. An article of manufacture comprising a machine-accessible storage medium having content stored thereon to provide instructions to result in a machine performing operations including:
    operating a first channel of a physical interface between two devices, the first channel defined in a specification of the physical interface, wherein the specification specifies that any broadcast on the first channel is to be identified by transmitting a header having a broadcast channel number and a broadcast address on the physical interconnect, and wherein the specification specifies the first channel is for transmitting to multiple devices simultaneously;
    transmitting a message on the first channel with the broadcast channel number and a device-specific identifier to indicate a specific device;
    operating a second channel of the physical interface, the second channel defined in the specification to be identified by a channel number and a specific device address, the second channel for sending a message to a specific device; and
    transmitting with a broadcast address to multiple devices on the second channel.

7. An article of manufacture according to claim 6, wherein the physical interconnect specification complies with the Mobile Scalable Link 2 (MSL2) specification.

8. A portable unit with multiple interconnected processors, comprising:
    an application processor to execute application-level operations;
    a peripheral subsystem with a peripheral processor; and
    a communication bus interconnecting the application processor with the peripheral processor, operation of the communication bus based, at least in part, on a communication bus standard, the communication bus to include a data line, the data line defined in the standard to transfer data on multiple channels, one of the channels defined in the standard to transfer only multicast data, the channel definition in the portable unit to be modified to allow non-multicast data transfer between the application processor and the peripheral processor on the one of the channels.

9. A portable unit according to claim 8, wherein the application processor comprises a general purpose processor.

10. A portable unit according to claim 8, wherein the peripheral subsystem comprises a wireless communication module.

11. A portable unit according to claim 8, wherein the peripheral processor comprises a signal processor.

12. A portable unit according to claim 8, wherein the communication bus standard comprises the Mobile Scalable Link 2 (MSL2) standard.

13. A portable unit according to claim 8, wherein multicast data comprises broadcast data.

14. A portable unit according to claim 8, wherein the channel definition is modified to allow the one of the channels to be activated with a device specific identifier and a channel number associated with the one of the channels.

15. A portable unit according to claim 14, wherein decoders in the application processor and the peripheral subsystem recognize the modified channel definition, and wherein another processor interconnected with the application processor and the peripheral subsystem on the communication bus does not recognize the modified channel definition and ignores the non-multicast data transfer on the one of the channels.

16. A portable unit according to claim 8, wherein the application processor and the peripheral subsystem arbitrate to gain control of the communication bus to transmit the non-multicast data on the one of the channels.

17. A portable unit according to claim 8, wherein the data line on the communication bus further comprises a different one of the channels defined in the standard to transfer only non-multicast data, the channel definition of the different one of the channels in the portable unit to be modified to allow multicast data transfer between the application processor and the peripheral processor on the different one of the channels.

18. A system comprising:
- a general purpose processor to execute application-level operations;
- a wireless communication module having a signal processor to provide wireless communication capability;
- a communication bus interconnecting the general purpose processor with the wireless communication module, one of the general purpose processor or the wireless communication module to operate as a master of the communication bus and the other a slave on the communication bus, the communication bus to include a data line, the data line defined in an interprocessor protocol standard to transfer data on multiple channels, one of the channels defined in the standard to transfer only broadcast data, the master to transmit data to the slave according to a modified version of the standard protocol channel definition, the modified channel definition to allow device-specific data transfer between the master and slave on the one of the channels; and
- an antenna coupled with the wireless communication module to transmit or receive radio signals.

19. A system according to claim 18, wherein the interprocessor protocol standard comprises the Mobile Scalable Link 2 (MSL2) standard.

20. A system according to claim 18, wherein the channel definition is modified to allow the one of the channels to be activated with a device-specific address and a channel number associated with the one of the channels.

21. A system according to claim 18, wherein the general purpose processor and the wireless communication module arbitrate to gain control of the communication bus to transmit non-multicast data on the one of the channels, the master being the one with control of the communication bus.

\* \* \* \* \*